United States Patent Office 3,445,458
Patented May 20, 1969

3,445,458
5-ARYL-3-CARBOXYACYLOXY-2H-1,4-BENZODI-
AZEPIN-2-ONES AND SALTS THEREOF
Stanley C. Bell, Philadelphia, Pa., assignor to American
Home Products Corporation, New York, N.Y., a corporation of Delaware
No Drawing. Continuation-in-part of application Ser. No. 134,569, Aug. 29, 1961. This application Apr. 12, 1965, Ser. No. 447,564
Int. Cl. C07d 53/06; A61k 27/00
U.S. Cl. 260—239.3                        4 Claims

ABSTRACT OF THE DISCLOSURE

The preparation of novel 3-carboxyacyloxy esters of 5-aryl-3-hydroxy-2H-1,4-benzodiazepin-2-ones having anticonvulsant and muscle-relaxant effects is described.

This application is a continuation-in-part of co-pending applications Ser. No. 134,569, filed Aug. 29, 1961, now abandoned, Ser. No. 230,283, filed Oct. 12, 1962, now abandoned, and Ser. No. 285,500, filed June 4, 1963, now U.S. Patent 3,296,249.

The present invention is concerned with novel compounds having psychotherapeutic properties. More specifically, the compounds sought to be patented are the salts of carboxyacyloxy derivatives formed by esterifying 5-aryl-3-hydroxy-2H-1,4-benzodiazepin-2-ones with a polycarboxylic acid derivative. These compounds have valuable anti-convulsant, and muscle-relaxing effects. Some of them exhibit sedative effects and some are tranquilizers without being sedative. Certain of them have useful disinhibiting effects and increase libido.

In the co-pending applications above referred to, there are disclosed and claimed pharmacologically active compounds having the formula:

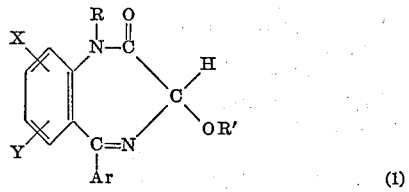

wherein X and Y are each members of the group consisting of hydrogen, chlorine, bromine, nitro, trifluoromethyl, and methylsulfonyl, R is a member of the group consisting of hydrogen and hydrocarbon radicals containing less than nine carbon atoms, Ar is an aryl radical selected from the group consisting of phenyl, thienyl, and phenyl bearing as a substituent a member of the group consisting of chlorine, fluorine, methoxy, methyl, and trifluoromethyl, and R' is a member of the group consisting of hydrogen, lower alkyl, and the acyl radicals of mono carboxylic acids such as acetyl, propionyl, caproyl, benzoyl, toluyl, phenyl acetyl, β-phenyl propionyl, cinnamoyl, aminoacyl radicals such as aminoacetyl, aminobenzoyl, and morpholino-acetyl, and haloacyl radicals such as chloroacetyl, chlorobenzoyl, bromo-benzoyl, etc.

The present invention is based on the discovery that the salts of carboxyacyloxy compounds of Formula 1, above, where R' is hydrogen, retain the pharmacological activity possessed by the compounds defined by said formula and are sufficiently soluble in solvents suitable for intravenous injection to permit their administration in injectable dosage forms. It is also noteworthy that the compounds of this invention are stable and theerfore may be stored without fear of deterioration. The compounds of this invention also form stable aqueous solutions that may be lyophilized.

The 1,3-dihydro-5-aryl-3-carboxyacyloxy-2H-1,4-benzo-diazepine-2-one compounds sought to be patented have the general formula:

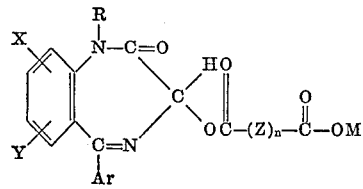

where R, Ar, X and Y are as above stated; M is hydrogen, sodium, potassium, rubidium, cesium, or ammonium, alkyl ammonium, or pyridinium; Z is an alkylene or arylene radical bearing from 0 to 4 COOM groups; and n is an integer from 0 to 8.

The compounds sought to be patented may be prepared by various esterification methods followed by treating the free acid with the required stoichiometric amounts of base. A preferred method consists in simply reacting in pyridine a compound of Formula 1, above where R' is H with the anhydride or the acid halide of a polycarboxylic acid using only enough 5-aryl-3-hydroxy-2H-1,4-benzodiazepin-2-one to react with one of the carboxylic acid groups. Alternatively, the polycarboxylic acid itself may be used instead of the anhydride if a dehydrating agent such as $H_2SO_4$ is employed. Similarly, compounds of Formula 1, above, where R' is H may be reacted with thionyl chloride to form the corresponding 3-chloro derivative which may be reacted with a salt of the selected polycarboxylic acid to form the desired compounds. Again, the subject compounds may be prepared by a transacylation reaction between a compound of Formula I above where R' is formyl or acetyl and a polycarboxylic acids.

These 5-aryl-3-carboxyacyloxy-2H-1,4-benzodiazepin-2-ones may also be prepared by the reaction of a 5-aryl-2H-1,4-benzodiazepin-2-one-4-oxide with a polycarboxylic acid halide substantially as described for monocarboxylic acid halides in co-pending application Ser. No. 134,569.

Among suitable polycarboxylic acids which may be used as reactants to provide the subject compounds are: oxalic acid, malonic acid, succinic acid, butane-1,2,4-tricarboxylic acid, aconitic acid, itaconic acid, and pentane tetracorboxylic acid, also phthtalic acid, glutaric acid, adipic acid and their anhydrides and acid halides.

It will be apparent to one skilled in the art of organic chemistry that in view of the well-recognized equivalency of the 1,4-benzodiazepines and their 4-oxide derivatives that the new compounds of this case are the full equivalents of their 4-oxides. The latter can be prepared by several routes, namely, from the corresponding 3-hydroxy compounds or the 3-chloro compounds as hereinbefore described, or by direct oxidation of the new compounds of this case by procedures that are generally known to those skilled in the art.

EXAMPLE 1

To 75 ml. of pyridine was added with stirring a mixture of 37 g. of 7-chloro-1,3-dihydro-3-hydroxy-5-phenyl-2H-1,4-benzodiazepin-2-one and 37 g. of succinic anhydride. In a few minutes the reaction mixture solidified. After heating on the steam bath the solid melted and was heated on the steam bath for a total of 1¼ hours. The reaction mixture was cooled to about 35° C. and then diluted with 50 ml. of ethanol.

Addition of water precipitated out 7-chloro-1,3-dihydro - 5 - phenyl - 3 - hydroxy - 2H - 1,4 - benzodiazepin-2-one, hemisuccinate ester, pyridinium salt, M.P. 139–141°.

To 57 g. of the above compound suspended in 1 l. of ethanol was added dropwise with stirring one equivalent of a 10% solution of sodium hydroxide in a 50% water-alcohol mixture. During this time the starting compound dissolved and then the sodium salt precipitated out. The sodium salt was collected and recrystallized from alcohol-water and 7-chloro-1,3-dihydro-5-phenyl-3-hydroxy-2H-1,4-benzodiazepin-2-one, hemisuccinate ester (sodium salt), was obtained hydrated with water.

Analysis.—Calcd. for $C_{19}H_{14}ClN_2O_5Na$ (dry basis): C, 55.82; H, 3.45; N, 6.85; Cl, 8.67; Na, 5.63. Found: C, 55.58; H, 3.41; N, 6.84; Cl, 9.00; Na, 5.71.

The sodium salt was upon acidification, converted to the above free acid and was obtained as the dihydrate, M.P. 110–112° C.

Analysis.—Calcd. for $C_{19}H_{13}ClN_2O_5 2H_2O$: C, 53.97; H, 4.53; N, 6.66; Cl, 8.38. Found: C, 54.06; H, 4.66; N, 6.59; Cl, 8.37.

The free acid, upon treatment with alkali, was reconverted to the sodium salt and isolated by removal of the solvent, as by lyophilization.

EXAMPLE 2

Following the procedure of Example 1, 37 g. of 7 - chloro - 1,3 - dihydro - 3 - hydroxy - 5 - phenyl - 2H-1,4-benzodiazepin-2-one is reacted with 55 g. of phthalic anhydride and the product is treated with potassium hydroxide to give 7-chloro-1,3-dihydro-5-phenyl-3-hydroxy-2H-1,4-benzodiazepin-2-one, hemiphthalate ester, potassium salt.

EXAMPLE 3

Following the procedure of Example 1, 37 g. of 7 - chloro 1,3 - dihydro - 3 - hydroxy - 5 - phenyl - 2H-1,4-benzodiazepin-2-one is reacted with 48 g. of adipic anhydride to give 7-chloro-1,3-dihydro-5-phenyl-3-hydroxy-2H-1,4-benzodiazepin-2-one, hemiadipate ester which is then treated with diethylamine to give the diethylammonium salt.

EXAMPLE 4

Following the procedure of Example 1, 25 g. of 7 - chloro - 1,3 - dihydro - 3 - hydroxy - 1 - methyl - 5-phenyl-2H-1,4-benzodiazepin-2-one is reacted with 25 g. of succinic anhydride and the product is treated with sodium hydroxide to give 7-chloro-1,3-dihydro-3-hydroxy - 1 - methyl - 5 - phenyl - 2H - 1,4 - benzodiazepin-2-one, hemisuccinate ester, sodium salt.

EXAMPLE 5

Following the procedure of Example 1, 30 g. of 7 - chloro - 5 - o - chlorophenyl - 1,3 - dihydro - 3 - hydroxy-2H-1,4-benzodiazepin-2-one is reacted with 25 g. of succinic anhydride in pyridine to give 7-chloro-5-o-chlorophenyl - 1,3 - dihydro - 3 - hydroxy - 2H - 1,4-benzodiazepin-2-one, hemisuccinate ester, pyridinium salt, which is then treated with sodium hydroxide to give the sodium salt.

EXAMPLE 6

4.3 g. of the sodium salt prepared in Example 1 was dissolved with the aid of gentle heat in sufficient water for injection to yield a final volume of 150 cc. This solution was sterilized by filtration and aseptically filled at 1.5 cc. per vial. These vials were frozen, lyophilized and aseptically stoppered. Each vial was then utilized for intravenous injection by reconstituting with 1 cc. of sterile water for injection in order to inject a dose of 43 mg. of 7-chloro-1,3-dihydro-3-hydroxy-5-phenyl-2H-1,4-benzodiazepin-2-one, hemisuccinate ester, sodium salt.

EXAMPLE 7

To a solution of 6.9 g. of 2-amino-5-chlorobenzophenone in chloroform add a solution of 2 equivalents of dichloroacetyl chloride in chloroform. Warm the reaction mixture and there is evolved a gas. Remove the solvent in vacuo and recrystallize the residue from ethanol to obtain 8.0 g. of 2'-benzoyl-4'-chloro-2-dichloroacetanilide; M.P. 88–90° C.

Analysis.—Calcd. for $C_{15}H_{10}Cl_3NO_2$: N, 4.09; Cl, 31.05. Found: N, 4.04; Cl, 31.3.

Heat 2' - benzoyl - 4' - chloro - 2 - dichloroacetanilide (10.26 g., 30 mmole) in 30 ml. methanol at reflux under nitrogen atmosphere for 3 days with 100 ml. of 1 M anhydrous methanolic hydroxylamine (prepared by neutralization of hydroxylamine hydrochlorodie in chilled methanol with sodium methoxide followed by separation of the resulting sodium chloride). Remove the solvent in vacuo, triturate the residue with ether, and filter the mixture. Extract the ether filtrate with three 20-ml. portions of 2 N sodium hydroxide solution.

Acidify the alkaline aqueous solution with hydrochloric acid and extract with ether. Separate the white crystalline solid (250 mg.), which separate in the ether phase, by filtering and wash with ether. Recrystallize the solid from acetonitrile to obtain 3,7-dichloro-1,3-dihydro - 5 - phenyl - 2H - 1,4 - benzodiazepin - 2 - one - 4-oxide, M.P. 212–213.

Analysis.—Calcd. for $C_{15}H_{11}N_2O_3Cl$: C, 56.09; H, 3.14; N, 8.72; Cl, 22.35. Found: C, 55.84; H, 3.06; N, 8.52; Cl, 21.5.

The N.M.R. spectrum shows a singlet at δ 6.56 for the proton in the 3-position and a broad peak at 12.18 corresponding to the lactam proton that disappears upon deuteration. The I.R. spectrum has the expected carbonyl absorption at 5.80μ.

The U.V. spectrum is characteristic of a 1,4-benzodiazepin-2-one 4-oxide with $$\lambda_{max.}^{EtOH} \ 239 \ m\mu \ (\epsilon \ 28,900), \ 324 \ (\epsilon \ 9,100)$$

What is claimed is:
1. 7 - chloro - 1,3 - dihydro - 3 - hydroxy - 5 - phenyl-2H-1,4-benzodiazepin-2-one, hemisuccinate ester.
2. 7 - chloro - 1,3 - dihydro - 3 - hydroxy - 5 - phenyl-2H-1,4-benzodiazepin-2-one, hemisuccinate ester, pyridinium salt.
3. 7 - chloro - 1,3 - dihydro - 3 - hydroxy - 5 - phenyl-2H-1,4-benzodiazepin-2-one, hemisuccinate ester, sodium salt.
4. 7 - chloro - 5 - o - chlorophenyl - 1,3 - dihydro - 3-hydroxy-2H-1,4-benzodiazepin - 2 - one, hemisuccinate ester, pyridinium salt.

References Cited

UNITED STATES PATENTS 3,321,469   5/1967   Walkenstein _____ 260—239.3

OTHER REFERENCES

Bell et al.: "J. Org. Chem.," vol. 27, pp. 1691–5 (1962).

HENRY R. JILES, Primary Examiner.

R. T. BOND, Assistant Examiner.

U.S. Cl. X.R.

260—999